Sept. 29, 1964  
D. L. LAFUZE  
3,151,294  
FREQUENCY SENSING CIRCUIT INCLUDING DIRECT CURRENT SOURCE AND REACTANCE MEANS  
Filed Jan. 3, 1961  
2 Sheets-Sheet 1

INVENTOR.  
DAVID L. LAFUZE  
BY Lawrence D. Norris  
ATTORNEY

Sept. 29, 1964   D. L. LAFUZE   3,151,294
FREQUENCY SENSING CIRCUIT INCLUDING DIRECT
CURRENT SOURCE AND REACTANCE MEANS
Filed Jan. 3, 1961   2 Sheets-Sheet 2

INVENTOR.
DAVID L. LAFUZE
BY Lawrence G. Norris

ATTORNEY—

United States Patent Office 3,151,294
Patented Sept. 29, 1964

3,151,294
FREQUENCY SENSING CIRCUIT INCLUDING DIRECT CURRENT SOURCE AND REACTANCE MEANS
David L. Lafuze, Cincinnati, Ohio, assignor to General Electric Company, a corporation of New York
Filed Jan. 3, 1961, Ser. No. 80,384
7 Claims. (Cl. 324—78)

My invention relates to frequency sensing circuits and in particular to a circuit which provides an output signal in response to variations in the frequency of an input signal from a preselected reference frequency.

Frequency error detection circuits are commonly used in control systems and similar applications. In such applications, the function of the circuit is to produce an output signal which is a function of the difference between the frequency of an input signal and some preselected reference frequency. The frequency of the input signal may represent some other parameter, such as speed for example, which is the variable ultimately to be controlled.

There are a number of circuits well known to those skilled in the art which are capable of performing such a function. The more sophisticated circuits, which are generally designed to overcome certain of the disadvantages of the relatively simple circuits, involve the use of more components and hence are physically larger in size and are more expensive to manufacture.

To give some idea as to the kinds of problems involved, one of the more simple frequency sensing circuits, that which uses the frequency dependent impedance characteristic of an inductance, will be discussed. This type of circuit may be viewed as being made up of two halves. In one half of the circuit, the input signal voltage is applied to an inductance, and in the other half of the circuit, the input signal voltage is applied to a resistance.

In this type of system, the magnitude of the input voltage signal is also generally made frequency dependent; that is, the magnitude of the input voltage increases as the frequency of signal increases and decreases as the frequency of the input signal decreases. This is the kind of characteristic which would, for example, be exhibited by an alternating current tachometer generator, in which the output voltage is directly proportional to output frequency.

The application of this kind of input signal to the inductance portion of the above circuit produces a current through the inductance which remains substantially constant with changes in input frequency because the impedance presented by the inductance is directly proportional to frequency, which in turn is directly proportional to the voltage magnitude of the input signal. Thus, increases and decreases in the input voltage are accompanied by corresponding increases and decreases in the impedance of the inductance, such that the current through the inductance branch of the circuit remains constant.

The current through the resistance branch, however, changes in direct proportion to variations in input frequency because the magnitude of the applied voltage varies directly with frequency. The output signal of the circuit is generated by subtracting the resistance and inductance currents from each other. This is quite commonly done by rectifying each of the two currents and applying them separately to a pair of input windings of a magnetic amplifier such that the output of the amplifier is proportional to the difference between the two currents.

The resistance and inductance elements are selected such that at some preselected reference frequency, the currents flowing in the two branches are equal and the output of the amplifier is thus zero when the input frequency corresponds to the reference frequency. When the input frequency is higher than the reference frequency, the current through the resistance branch is higher than that through the inductance branch and an output signal of a corresponding polarity is generated. When the input frequency is lower than the reference frequency, the current in the inductance branch is higher than that flowing in the resistance branch and an output signal of opposite polarity is thus produced.

Several characteristics of this type of circuit will now be discussed. First of all, it should be noted that because of the difficulty of subtracting the two branch currents in their alternating current form, both currents are rectified before the subtracting operation is performed. This means that the voltage drops across the diodes must be taken into account and suitable adjustments made to avoid inaccuracies from this source. Diode voltage drop is, however, in the typical case quite sensitive to temperature and temperature fluctuations therefore cause difficulty in compensating for diode voltage drop, particularly in the resistance branch. The rectifier voltage drops in the reactance branch of the circuit present substantially less of a problem because these drops are approximately 90° out of phase with the reactance voltage as opposed to the resistance branch where the drops are in phase with the voltage across the resistor. In addition, this type of circuit, and others like it which depend on reactive impedances are sensitive to harmonics in the alternating current exciting source. And, the gain or sensitivity of such a circuit is directly affected by the gain of the signal source. In other words, at off null conditions, the magnitude of the error signal produced is proportional to the slope of the voltage vs. speed characteristic of the A.-C. source, which may vary substantially with changes in environmental conditions and from unit to unit by reason of manufacturing tolerances.

All of the foregoing problems can be solved, of course, or at least the characteristics in these areas can be substantially improved, in the more sophisticated circuits. Such circuits, however, becomes much more complex and costly.

It is accordingly an object of my invention to provide an improved speed or frequency sensing circuit having significantly improved performance in the foregoing respects with only a modest increase in complexity and cost over the fundamental circuit.

I accomplish this, in one embodiment of my invention, by providing simple circuitry capable of generating a square wave, the frequency of which is proportional to the frequency of an A.-C. source and the magnitude of which is proportional to the magnitude of a D.-C. reference voltage. The square wave is utilized to excite a reactance element, such as an inductance, and the D.-C. reference voltage is connected through a resistance to generate a fixed magnitude reference current. Because the magnitude of the square wave is fixed by the magnitude of the D.-C. reference voltage, the current through the reactance element, in the case of an inductance, varies inversely with the frequency of the square wave, which is in turn proportional to the frequency of the A.-C. source. The current through the reactance element is subtracted from the reference current in any suitable manner, such as by applying the two signals to subtractively connected input windings of a magnetic amplifier, to form the output signal. The reference current is adjusted so that at the preselected reference frequency, the current through the reactance element is equal to the reference current. At the null or reference frequency, the output of the system is therefore zero.

It will be observed that the system is not sensitive to harmonics in the A.-C. source because the shape of the square wave is independent of the shape of the exciting voltage. It will also be observed that the rectifier voltage drop problem is eliminated in the resistive branch of the circuit because the reference current is already in D.-C.

form and may be subtracted directly. Also, since the voltage magnitude of the square wave is independent of the magnitude of the A.-C. source voltage, the gain of the circuit is not affected by the gain of the source.

Other objects and advantages of my invention will become apparent from the following description taken in connection with the accompanying drawings in which.

Figure 1:
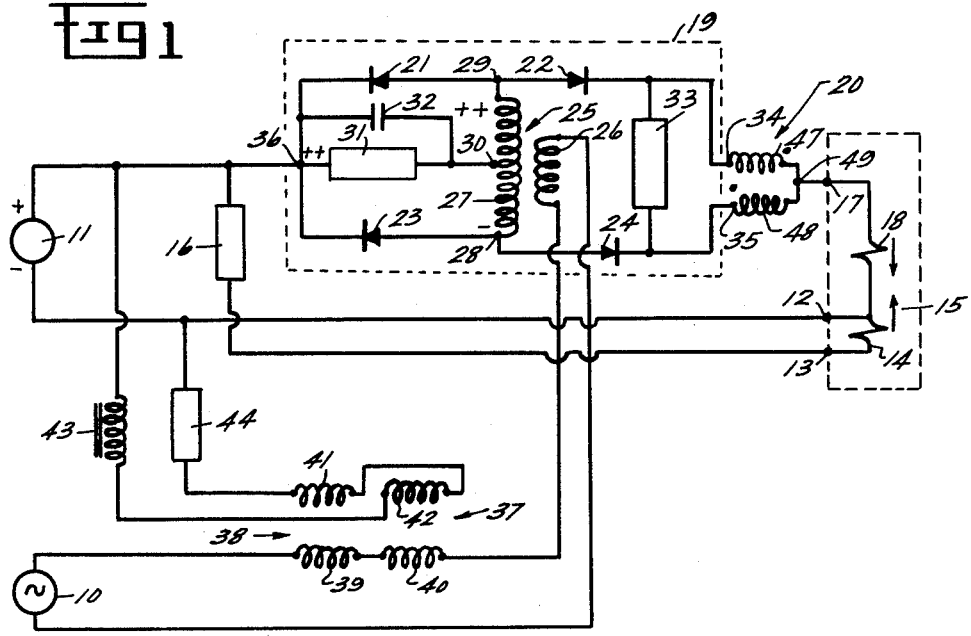
FIG. 1 is a circuit diagram of a frequency sensing system embodying my invention.

Referring now to FIG. 1, I have illustrated a frequency measuring system embodying my invention and having the capability of producing an output or error signal in response to variations in the frequency of an A.-C. source 10 from a preselected reference frequency. The reference frequency is established by means of a D.-C. voltage source 11 which may be adjustable but which, during operation of the system, remains fixed at some preselected magnitude. The D.-C. voltage source 11 is connected as shown to terminals 12 and 13 of an input winding 14 of a magnetic amplifier 15. The magnitude of the current flow in the winding 14 may be adjusted by means of a variable resistor 16.

The D.-C. source 11 is also connected to the terminals 12 and 17 of a second input winding 18 of the magnetic amplifier 15 through a synchronous switch 19 and an inductance element 20. Because the nature of the other elements in the circuit and their method of operation is dependent on an understanding of the operation of the synchronous switch 19, I will first present a description of the components and method of operation of that element of the system before proceeding further.

The synchronous switch 19 is comprised of a diode bridge formed of diodes 21, 22, 23 and 24 to which a driving voltage is supplied through an input transformer 25. The transformer 25 is provided with primary and secondary windings 26 and 27 respectively, the secondary winding 27 having output terminals 28 and 29 and a center tap terminal 30. The terminal 28 is connected between the two diodes 23 and 24 and the terminal 29 is connected between the terminals 21 and 22.

The diodes 21 and 23 are connected from the transformer terminals 29 and 28 respectively back to the center tap 30 through a resistor 31 which is shunted by a capacitor 32. The circuit of the synchronous switch 19 is completed by an output resistor 33 connected across the diodes 22 and 24 and a pair of output terminals 34 and 35, as shown. The operation of the synchronous switch will now be described.

Assume for purposes of explanation that a sinusoidal, A.-C. voltage is applied to the primary winding 26 of the transformer 25 and that at a given particular time, the voltage polarities are as shown with terminals 29 and 30 both being positive with respect to terminal 28 but with terminal 30 being at a lower positive potential than terminal 29.

It will be observed that with the polarities as shown, a current flow path is established between terminals 29 and 30 through the diode 21 and the resistor 31 and, assuming that the forward resistance of the diode 21 may be neglected in comparison with the magnitude of the resistance of the resistor 31, that the full difference in potential between terminals 29 and 30 appears as a voltage drop across resistor 31 having the polarity as shown. The positive side of the D.-C. reference 11 is connected to an input terminals 36 of the switch, and looking into the switch at this point, it will be observed that a low impedance path is established from the D.-C. reference through the resistance 31, the upper half of winding 27, and the diode 22 to the output terminal 34 by reason of the fact that the voltage drop across the resistor 31 is equal and opposite to the voltage rise across the upper half of the winding 27. In other words, the A.-C. voltage cancels itself out along the path just described and the voltage appearing at output terminal 34 is thus substantially equal to the D.-C. voltage magnitude of the source 11.

It will also be seen that along the path from the input terminal 36 through the resistor 31, the lower half of winding 27 and the diode 24 to the output terminal 35, the total voltage across the winding 27, that is the voltage between terminals 29 and 28, is in opposite to the reference voltage 11, again neglecting the drop across diode 21. This means that so long as the voltage across the secondary winding 27, that is between terminals 28 and 29, is greater than the voltage of the D.-C. reference 11, current flow from the D.-C. reference through the lower half of winding 27 to output terminal 35 is blocked.

Similarly, it can be shown that during the alternate half cycle of the driving voltage, which produces a potential between output terminals 28 and 29 opposite to that shown, a low impedance path is established between input terminal 36 and output terminal 35 through the resistor 31, the lower half of winding 27 and the diode 24. At the same time, current flow through the upper half of winding 27 and diode 22 to output terminal 34 is blocked by the opposing voltage across the transformer secondary winding 27. Thus, on alternate half cycles, and so long as the transformer secondary voltage is greater than the reference voltage 11, current is allowed to flow alternately through the upper diode 22 to output terminal 34 and then through lower diode 24 to output terminal 35.

It will be appreciated, as I have pointed out above, that in order for the switch 19 to function in the manner described, the driving voltage must always remain greater than the D.-C. reference voltage. In the case of a sinusoidal A.-C. exciting voltage, however, there will occur an interval at the start and at the end of each half cycle over which the driving voltage is less than the D.-C. reference voltage. During these intervals, the switch is neither completely open nor completely closed.

Thus, in order for the switch to make an essentially instantaneous change from the path through diode 22 to terminal 34 over to the path through diode 24 to terminal 35, the driving voltage must make a substantially instantaneous change from a voltage greater than the reference voltage to a voltage of opposite polarity greater than the reference voltage. It will be observed that the requirement just discussed relates only to the switchover from a voltage in one direction greater than the reference voltage to a voltage of opposite polarity greater than the reference voltage and that no requirements are imposed on the remainder of the wave shape of the driving voltage except that it remain throughout each half cycle greater than the D.-C. reference voltage.

I will now describe the arrangement which I use in the embodiment of FIG. 1 to generate a driving voltage meeting the foregoing requirements. Referring to FIG. 1, there is shown a pair of saturable reactors 37 and 38 having a series connected pair of gate windings 39 and 40 and a pair of control windings 41 and 42. The control windings 41 and 42 are connected to the D.-C. source 11 through a series connected choke 43 and a resistor 44 as shown and are further connected to drive their respective cores in opposite directions. The gate windings 39 and 40 are connected in series with the A.-C. source 10, the frequency of which is the variable to be measured, to the primary winding 26 of the transformer 25.

Since the gate windings 39 and 40 are connected in series, the same current must flow in both of these windings and the same gate ampere turns are therefore applied to each core. The control windings 41 and 42 are also connected in series but in a direction such that the control ampere turns add to the gate current ampere turns of one core and subtract from the gate current ampere turns of the other core. It other words, for a first preselected direction of gate winding current flow, the control ampere turns of reactor 38 add to its gate ampere turns and the control ampere turns of reactor 37 subtract from its gate ampere turns. For a gate current flow in the opposite direction, the control ampere turns of reactor 38 subtract from its gate ampere turns and the control ampere turns of reactor 37 add to its gate ampere turns.

With a control current flow other than zero, the net ampere turns on the two cores must therefore be unequal. It follows then that for control values larger than the exciting ampere turns, the cores of the two reactors 37 and 38 can not be simultaneously unsaturated and at least one must be saturated.

Although the operation of the series connected saturable reactor is well known in the art (see, for example, the material beginning at page 85 of the book "Magnetic Amplifier Engineering," by George M. Attura, McGraw Hill Book Co., 1959), I will present a brief explanation here of its operation along with a presentation of the wave shape produced in response to a sinusoidal A.-C. voltage excitation.

Assume for purposes of explanation that the control circuit A.-C. impedance is very high by reason of the combined impedance of resistor 44 and choke 43. Assume further that the time interval is such that the control and gate ampere turns of reactor 38 add and the control and gate ampere turns of reactor 37 subtract from each other. The core of reactor 38 must therefore be saturated, as explained above.

If the control circuit impedance is infinite and the exciting current is neglected, the gate ampere turns must equal the control ampere turns in the core of reactor 37. Because the control current flowing in winding 42 is constant, it follows that the gate current flowing in winding 40 must also be constant. When the supply reverses polarity, the gate current can not immediately reverse because in order to do so, the core of reactor 37 must reach saturation. The core of reactor 37 can not saturate until it has discharged as many volt seconds as it has just absorbed. The gate current continues at a constant value until this occurs, and upon saturation of reactor 37, the gate current reverses its direction until it reaches a value of equal and opposite polarity to match the gate ampere of reactor 38 with the control ampere turns of that reactor.

Figure 3:
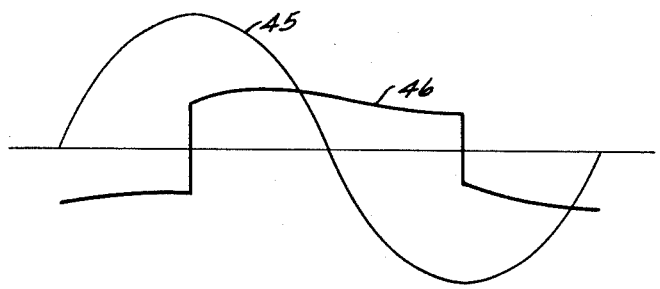
FIGS. 3 and 4 are graphical presentations of the wave shapes of the electrical signals generated by certain elements of the system of FIGS. 1 and 2 respectively.

It will be observed that with operation in the manner just described, the series connected saturable reactor produces essentially a square wave of gate current flow. There are a number of factors, however, which cause degradation in the pure square wave shape and the actual gate or output current is essentially of the shape shown in FIG. 3, in which 45 is the sinusoidal excitation voltage of the source 10 and 46 is the gate or output current. It will be observed, however, that the essential characteristic of a substantially instantaneous reversal in polarity is satisfied and that the wave shape in the intervals intermediate the polarity reversal points is not material so long as the voltage produced across the winding 27 remains greater than the D.-C. reference voltage 11.

It will be seen that with the foregoing conditions satisfied, the synchronous switch 19 produces at its output terminals 34 and 35, on alternate half cycles of the driving current 46, a voltage first at terminal 34 which is substantially equal to the reference voltage 11 and then, during the alternate half cycle, a voltage at terminal 35 which is substantially equal to the reference voltage 11. I utilize this square wave output to drive the inductor 20.

The inductor 20 is formed of two inductively coupled coils 47 and 48 connected to a center tap terminal 49 which is in turn connected to the input terminal 17 of the magnetic amplifier 15. Resulting current flow in the input winding 18 is depicted by the arrow positioned adjacent the winding and is in opposition to the current flow produced in winding 14 by the D.-C. reference 11.

Over the half cycle when the terminal 34 is positive, the inductor 20 is driven in one direction, both coils being active by reason of their being inductively coupled to drive each other in opposite directions and by reason of the commutating resistor 33 connected as shown. During the alternate half cycle, when the terminal 35 is positive, the inductor 20 is driven in the opposite direction. The inductance 20 is thus driven by a square wave, the frequency of which is equal to the frequency of the source 10 and the amplitude of which is constant and determined solely by the magnitude of the D.-C. reference voltage 11. The capacitor 32 provides a low impedance path for the A.-C. component of the current passed to the inductance 20. Since this A.-C. component is only a ripple on a D.-C. current, an electrolytic capacitor may be used.

The reference current flowing in winding 14 may be adjusted by varying the resistance 16 such that at a preselected frequency of the A.-C. source 10, the currents flowing in windings 14 and 18 produce equal and opposite inputs to the magnetic amplifier 15 so that at that particular frequency the output of the amplifier is zero. An increase in the frequency of the source 10 above the reference level causes a decrease in the current flowing in winding 18 by reason of the increased impedance of the inductance 20, thereby producing an output from the amplifier 15, the direction of which is determined by the direction of current flow in the winding 14 and the magnitude of which is proportional to the frequency error. Conversely, a decrease in the frequency of the source 10 below the reference level causes an increase in the current flowing in winding 18, thus producing an output in the opposite direction proportional to frequency error.

It will be observed that in the system of FIG. 1 the square wave excitation of the inductance 20 is independent of the wave shape of the A.-C. source voltage 10, such that the system is not sensitive to harmonics in the source. It will also be seen that the response of the system is not affected by any frequency dependent voltage characteristics of the source 10. In the case of a tachometer generator, for example, the output voltage is proportional to speed, but the slope of this characteristic, that is the number of volts per r.p.m., varies considerably with manufacturing tolerances from one unit to the next, and also in service with changes in environmental conditions, particularly temperature. Because the magnitude of the square excitation in my system is determined solely by the magnitude of the reference voltage 11, it is not affected by variations in this characteristic. Finally, it will be observed that no rectification is required in the resistance branch of the circuit because the reference current is generated directly in D.-C. form, thus eliminating the rectifier voltage drop problem normally associated with the typical reactance-resistance frequency reference.

Figure 2:
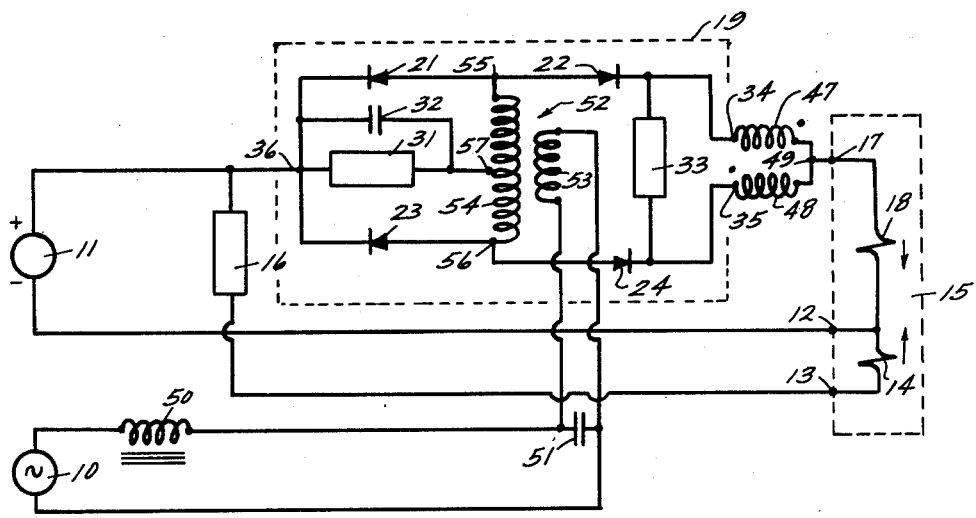
FIG. 2 is a circuit diagram of a frequency sensing system illustrating an alternative embodiment of my invention.

Referring now to FIG. 2, I show an alternative embodiment of my invention which differs from the embodiment of FIG. 1 only in the manner in which the synchronous switch 19 is excited. In FIG. 2, I have used like numerals to designate the elements corresponding to those in FIG. 1.

In the embodiment of FIG. 2, I utilize a parallel, non-linear resonant circuit comprising an inductance 50, a capacitor 51 and a saturable transformer 52, the transformer 52 having primary and secondary windings 53 and 54 respectively. The secondary winding 54 is provided with output terminals 55 and 56 and a center tap terminal 57, which are connected to the synchronous switch 19 in the same manner as the secondary winding 27 of FIG. 1. The capacitor 51 and the inductor 50 are connected in series across the source 10 and the primary winding 53 of the saturable transformer is connected in parallel with the capacitor 51.

Figure 4:
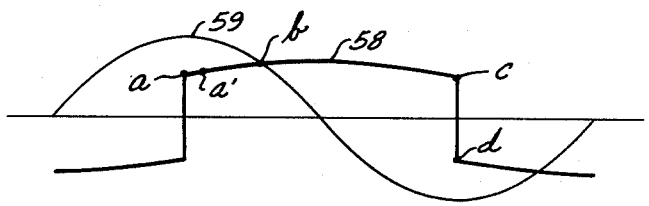

In FIG. 4, I have shown at 58 the shape of the voltage appearing across the input winding 53 of the saturable transformer in relation to the sinusoidal voltage 59 of the source 10. With reference to FIGS. 2 and 4, the operation of the non-linear resonant circuit will now be explained.

Starting at some point $a^1$ just after the point $a$ in FIG. 4, the supply voltage 10 causes a small current to flow into the capacitor 51 through the linear inductor 50. Neglecting the current drawn by the saturable transformer, this current builds up the charge on the capacitor 51. The voltage appearing across the inductor 50 is the difference between the capacitor voltage 58 and the supply voltage 59.

At point $b$, therefore, the voltage across the inductor 50 reaches zero and begins to build up in the opposite direction, but the current flowing through the inductor 50 continues in the same direction until the energy previously stored in it discharges. The capacitor 51 therefore continues to charge or substantially hold its charge after the point $b$ because of the discharge current from the inductor 50.

In the meantime the saturable transformer 52 has had applied to it a voltage equal to the voltage across the capacitor 51 and moves from saturation in one direction at the point $a$ to saturation in the opposite direction at point $c$. At point $c$, the inductance of the saturable transformer 52 is reduced to a very small value because of saturation and the capacitor 51 discharges through the saturated core. If the resistance of the winding 53 is very small, only a small portion of the capacitor discharge energy will be dissipated and most of it will be stored in the small inductance of the saturated transformer 52. This inductively stored energy is then transferred back to the capacitor to recharge it to the opposite polarity shown at point $d$ in the same manner as energy stored in a linear inductor charges a capacitor in a conventional resonant circuit.

Because the transformer 52 is saturated during this energy exchange and its inductance is thus very small, the exchange occurs very rapidly, making the slope between points $c$ and $d$ very nearly vertical. At point $d$ then, the transformer 52 is saturated in the opposite direction from that at point $a$ and the next half cycle proceeds in the same manner as that just described.

Thus, the input to the primary winding 53 is of the form shown by the wave 58 in FIG. 4, with reversals in polarity occurring substantially instantaneously to produce operation of the synchronous switch 19 and the remaining elements of the circuit in the manner already described.

It will be appreciated by those skilled in the art that there are methods other than those which I have disclosed here for generating a square wave whose magnitude is determined by a D.-C. voltage source and whose frequency is established by an A.-C. voltage source. I have found the particular circuits which I have presented, however, to be quite useful in themselves in their application to the system of my invention.

It will be observed from the foregoing that I have provided a frequency measuring or sensing circuit in which a reactance element is excited by a square wave whose amplitude is a function of a D.-C. reference voltage and whose frequency is a function of the frequency to be measured, and in which current flow through the reactance element is compared with a D.-C. reference current to detect changes in frequency from a preselected level. It will be appreciated that the circuits shown may be modified in a number of ways, some of which I have already suggested. For example, voltage and current sources may be easily interchanged with suitable circuit modifications well known to those skilled in the art and I thus prefer to designate these as signal sources rather than voltage or current sources. Also, the reference reactance element may be a capacitor instead of an inductor 20 as I have shown, with suitable circuit modifications which will readily occur to those skilled in the art.

It will thus be apparent that various modifications and substitutions of elements may be made in the embodiment of my invention which I have presented without departing from the true scope and spirit of my invention as I have defined it in the appended claims.

What I claim as new and desire to secure by Letters Patent of the United States is:

1. Means for producing a signal in response to variations in the frequency of an alternating current source comprising first generating means for generating an electrical signal of substantially square wave shape having a regulated magnitude and being of a frequency proportional to the frequency of said source, a reactance element, means connecting said square wave signal generating means to said reactance element for transmission of said signal through said reactance element, second generating means for generating a reference electrical signal of substantially constant magnitude, means connecting said second means to said first means for excitation of said first generating means by said reference electrical signal such that said electrical signal of substantially square wave shape has a magnitude equal to said reference electrical signal and means for comparing the electrical signal response generated in said reactance element by said square wave signal with said reference signal to detect variations in the frequency of said source.

2. Apparatus as set forth in claim 1 in which said square wave signal generating means comprises a synchronous switch, and non-linear reactance means interconnecting said alternating current source and said synchronous switch, said non-linear reactance means producing an alternating current driving signal to said synchronous switch, the polarity of which reverses substantially instantaneously.

3. Means for detecting variations in the frequency of an alternating current source from a preselected reference frequency comprising first signal generating means connectible to a direct current source for producing a unidirectional reference signal of substantially constant magnitude, second signal generating means connectible to said direct current source and to said alternating current source and being capable of generating a square wave signal, the magnitude of which is proportional to the magnitude of said reference signal and the frequency of which is determined by the frequency of said alternating current source, a reactance element, means connecting said second signal generating means to said reactance element for transmission of said square wave signal through said reactance element whereby in operation said reactance element is excited by said square wave signal, and means for comparing the magnitude of the response produced in said reactance element by said square wave signal with the magnitude of said reference signal to detect variations in the frequency of said alternating current source from a preselected reference frequency.

4. Apparatus as set forth in claim 3 in which said second signal generating means comprises a synchronous switch, and non-linear reactance means interconnectig said synchronous switch and said alternating current source, said non-linear reactance means producing an alternating driving signal to said synchronous switch, the polarity of which reverses substantially instantaneously.

5. Apparatus as set forth in claim 4 in which said non-linear reactance means includes a series connected pair of saturable reactors.

6. Apparatus as set forth in claim 4 in which said non-linear reactance means includes a saturable transformer.

7. Means for detecing variations in the frequency of an alternating current source from a preselected reference comprising:

a first signal generating means for generating a unidirectional reference signal of substantially constant magnitude, a second signal generating means for generating a substantially square-wave shaped signal of a frequency equal to the frequency of said alternating current source and of a magnitude equal to said unidirectional reference signal, comprising:
a synchronous switching means having a first input circuit for receiving said unidirectional reference signal, a second input circuit for excitation of said switching means by said alternating current source, and a pair of output circuits,
a diode bridge circuit having normal first, second, third and fourth connections,
a transformer having a center tapped secondary winding connected across said diode bridge circuit between opposite first and third connections,
said transformer having a primary winding connected to be excited by said alternating current source passing through said second input circuit,
said first input circuit connected to said second connection of said diode bridge with conductor means further connecting said second diode bridge connection to a center tap of said transformer secondary winding,
a two part reactance element connected in said diode bridge with one part connected between said fourth and said third connections of said diode bridge and the other part connected between said first and said fourth connections of said diode bridge,
means for comparing the magnitude of the response produced in said reactance element by conduction of said square wave signal with the magnitude of said reference signal to detect variations in the frequency of said alternating current source from a preselected reference frequency.

References Cited in the file of this patent

UNITED STATES PATENTS

| | | |
|---|---|---|
| 1,929,259 | Rich | Oct. 3, 1933 |
| 2,446,188 | Miller | Aug. 3, 1948 |
| 2,900,600 | Gregson | Aug. 18, 1959 |
| 2,902,647 | Hartung | Sept. 1, 1959 |
| 2,908,864 | Shepard | Oct. 13, 1959 |
| 2,921,260 | Crandon et al. | Jan. 12, 1960 |
| 2,947,863 | Buie | Aug. 2, 1960 |
| 2,950,438 | Gilbert | Aug. 23, 1960 |
| 3,034,052 | Estoppey | May 8, 1962 |